United States Patent
Zhang

(10) Patent No.: US 8,180,040 B2
(45) Date of Patent: May 15, 2012

(54) CORPORATION SWITCHBOARD PLATFORM AND CALL PROCESSING METHOD

(75) Inventor: Dong Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/145,792

(22) PCT Filed: Nov. 18, 2009

(86) PCT No.: PCT/CN2009/075009
§ 371 (c)(1),
(2), (4) Date: Jul. 22, 2011

(87) PCT Pub. No.: WO2010/094195
PCT Pub. Date: Aug. 26, 2010

(65) Prior Publication Data
US 2011/0274264 A1  Nov. 10, 2011

(30) Foreign Application Priority Data
Feb. 17, 2009  (CN) .......................... 2009 1 0009528

(51) Int. Cl.
*H04M 7/00*  (2006.01)

(52) U.S. Cl. ......... 379/221.08; 379/221.09; 379/221.11; 379/221.12

(58) Field of Classification Search ................... 379/219, 379/220.01, 221.08–221.12, 279
See application file for complete search history.

(56) References Cited

U.S. PATENT DOCUMENTS

| | | | |
|---|---|---|---|
| 5,661,782 A * | 8/1997 | Bartholomew et al. .... | 379/88.18 |
| 6,075,854 A * | 6/2000 | Copley et al. ............ | 379/207.14 |
| 6,535,741 B1 | 3/2003 | Aschir et al. | |
| 6,563,793 B1 * | 5/2003 | Golden et al. ................ | 370/236 |

(Continued)

FOREIGN PATENT DOCUMENTS

CN  1716872 A  1/2006

(Continued)

OTHER PUBLICATIONS

International Search Report in international application No. PCT/CN2009/075009, mailed on Feb. 11, 2010.
English Translation of the Written Opinion of the International Search Authority in international application No. PCT/CN2009/075009, mailed on Feb. 11, 2010.

(Continued)

*Primary Examiner* — Harry Hong
(74) *Attorney, Agent, or Firm* — Oppedahl Patent Law Firm LLC

(57) ABSTRACT

The present invention discloses a corporation switchboard platform and a call processing method. The corporation switchboard platform comprises a corporation switchboard service control point, a corporation switchboard service switching point and an intelligent peripheral, wherein the corporation switchboard service control point comprises: a basic call processing module for determining whether the capability of an existing network switching device can support a call triggered by a service switching point of a switching network and sending the call to an enhanced service capability module when determining that the capability of the existing network switching device cannot support the call; and an enhanced service capability module for controlling the intelligent peripheral and the corporation switchboard service switching point to complete a service related to the call. Compared with a corporation switchboard system based on an intelligent platform technology, the technical solution of the present invention provides a higher system capacity and an improved system capability and reduces the rerouting overhead of network.

16 Claims, 6 Drawing Sheets

U.S. PATENT DOCUMENTS

| | | | |
|---|---|---|---|
| 6,778,822 B1 * | 8/2004 | Visser et al. | 455/422.1 |
| 6,831,914 B1 * | 12/2004 | Wheeler et al. | 370/352 |
| 2003/0169866 A1 * | 9/2003 | Williams et al. | 379/220.01 |
| 2005/0123120 A1 * | 6/2005 | Creamer et al. | 379/220.01 |
| 2005/0259804 A1 * | 11/2005 | Bedingfield | 379/211.02 |
| 2006/0115068 A1 * | 6/2006 | Dotan et al. | 379/221.15 |

FOREIGN PATENT DOCUMENTS

| | | |
|---|---|---|
| CN | 1716873 A | 1/2006 |
| CN | 101227431 A | 7/2008 |

* cited by examiner

CORPORATION SWITCHBOARD PLATFORM AND CALL PROCESSING METHOD

TECHNICAL FIELD

The present invention relates to a technology used for a corporation switchboard system in the communication field, and more particularly, to a corporation switchboard platform and a call processing method.

BACKGROUND

At present, with the increasing popularization of society informationization and network, the demands of group subscribers on communication services become comprehensive and diversified. In addition to fixed communication and mobile communication, group subscribers also need a Virtual Private Network (VPN) service, a group contact list service, a voice mailbox service, a business conference service, a call center service and the like. In this case, group subscribers need to purchase a set of equipment to achieve the functions above, leading to a high investment and a high maintenance cost. Therefore, it is generally hoped by group subscribers that telecom operators can provide an integrated solution to meet their information needs. In order to meet the aforementioned demands of group subscribers, telecom operators provide a corporation switchboard system as a solution, which integrates an integrated VPN, a group contact list, a voice mailbox, a business conference system, a call center system and the like using existing network devices. The corporation switchboard system is a voice portal for the communication between the inside and the outside of the corporation, which takes a uniform switchboard number as a carrier and uses contact list management as well as call forwarding as a core, and synchronously adds flexible functions including automatic voice navigation, message mailbox and short message service broadcast.

In prior art, a corporation switchboard system mainly includes four services which are corporation switchboard, integrated VPN, conference call and information service.

The integrated VPN, the core functions of which are dialing internal short numbers and flexible charging, aims to construct a logic private network with fixed networks of telecom operators distributed in different areas, such as Public Switched Telephone Network (PSTN) and soft switch, as well as subscribers of Code Division Multiple Access (CDMA), subscribers of Global System for Mobile Communication (GSM) and subscribers of Next Generation Network (NGN). The subscribers in the same network can contact with each other with short numbers or real numbers, and the members in the dedicated network can enjoy the benefits of a flexible charging strategy for intranet calls and extranet calls.

The conference call is a service of realizing multi-party communication with telephones, by which conference participants from different places can access a conference system at an appointed time by initiating a call or receiving a system call so as to participate in a conference call.

The information service aims to provide a uniform information platform for a corporation, so as to enable employees or clients of the corporation to acquire real-time online information of the corporation through manual service or corporation portals and the like.

With the development of telecom technologies, existing corporation switchboard systems are typically realized in an intelligent network mode or an intelligent platform mode.

The intelligent network mode, which realizes a virtual switchboard service, that is, a corporation switchboard service, using an intelligent network technology, mainly adopts a design idea used in an intelligent network technology of separating a call from a service control to separate call proceeding of a terminal from a virtual switchboard service control. And in terms of a service trigger mode, a virtual switchboard service is triggered by inquiring of a Service Control Point (SCP).

FIG. 1 is a schematic diagram illustrating the structure of a virtual switchboard system realized using an intelligent network technology in a related technology. As shown in FIG. 1, a Service Switching Point (SSP) can detect a request for a virtual switchboard service, communicate with an SCP, make a response to the request of the SCP, and allow the effect of service logic in the SCP on call processing. The SCP is a service control point which is a core part for virtual switchboard service processing and mainly takes charge of the control on virtual switchboard service logic. The SCP is connected with the SSP and an IP via a No. 7 signaling network or an Intelligent Peripheral (IP) core network. A communication rule between the SCP and the SSP or the IP can adopt various control signaling, such as intelligent network application part/Customized Application for Mobile Network Enhanced Logic (CAMEL) part/mobile application part/session initiation protocol and the like. The IP provides a virtual switchboard service with functions such as playing, number receiving, recording and the like.

The adoption of the intelligent network mode is advantaged in little session rerouting, particularly in a mobile network, a Mobile Switching Center (MSC) for services in each area can act as a virtual switchboard SSP to trigger a service, there exist only signaling links between the MSC and a switchboard SCP. As a session carrier is not rerouted to a uniform switchboard platform, a switchboard system constructed in the intelligent network mode has an efficient service processing capability and is capable of increasing system capacity.

However, the intelligent network mode also has the following obvious disadvantages: SSPs are distributed everywhere in a switching network, but SSPs are constructed in different periods with different processing capabilities, it cannot be guaranteed that each SSP within the switching network can execute a service control instruction of an SCP correctly. For example, a conference call function, an extension co-vibration and sequential vibration function, an extension session holding and forwarding function, an extension queuing function and the like all require SSPs to complete specific call processing under the control of an SCP, whereas in a practical network evolution process, with the evolution of control signaling, not all SSPs can support said specific call processing, thus, the functions of a switchboard service are significantly limited.

As to the intelligent platform mode, FIG. 2 is a schematic diagram illustrating the structure of a virtual switchboard system realized using an intelligent platform technology in a related technology. As shown in FIG. 2, in the intelligent platform mode, all the calls and signaling related to a corporation switchboard are required to be forwarded to a corporation switchboard intelligent platform which provides uniform call control and media resource control functions. This implementation mode can realize the deployment of a corporation switchboard system conveniently and reliably and provide service functions regardless of the capability of existing network switching devices, and synchronously, by widening the broadband of the intelligent platform, provide more various service capabilities, including Automatic Speech Recognition (ASR), Text-To-Speech (TTS), call hold and control, extension queuing, remote manual corporation switchboard and the like.

As all calls are required to be connected to a corporation switchboard system, the intelligent platform mode is more likely to lead to session rerouting. Therefore, a virtual switchboard system realized in the intelligent platform mode is limited by system capacity and thus hinders large-scale application of services.

It can be seen from the description above that a system with high capacity, which can be provided in the intelligent network mode, is a capability-limited system which cannot provide various services for being limited by the capability of existing network devices; while in the intelligent platform mode, a system is a capacity-limited system because, although it is free from limitation due to the capability of existing network devices but is subjected to severe session rerouting which hinders large-scale application of services. No technical solution has been proposed yet for addressing the aforementioned problems existing in service switchboard systems realized respectively in the intelligent network mode and the intelligent platform mode.

SUMMARY

Aspects of the present invention are to provide a corporation switchboard platform and a call processing method which can address the problem that the capability or capacity of a service switchboard system is limited, and thereby enable the large-scale is application of services.

According to one aspect, a corporation switchboard platform is provided. The corporation switchboard platform comprises a corporation switchboard service control point, a corporation switchboard service switching point and an intelligent peripheral. The corporation switchboard service control point comprises: a basic call processing module arranged to determine whether the capability of an existing network switching device can support a call triggered by a switching network service switching point and send the call to an enhanced service capability module when the capability of the existing network switching device cannot support the call; and an enhanced service capability module arranged to control the intelligent peripheral and the corporation switchboard service switching point to complete a service related to the call.

Furthermore, the basic call processing module may be further arranged to control the switching network service switching point to forward the call when the capability of the existing network switching device can support the call.

The basic call processing module may comprise a processing module, an evaluation module, a determination module and a notification module; wherein the processing module is arranged to pre-process the call and determine media resources and a call control capability needed by the call; the evaluation module is arranged to evaluate the capability of the existing network switching device; the determination module is arranged to determine whether the capability of the existing network switching device evaluated by the evaluation module can support the media resources and/or the call control capability needed by the call; and the notification module is arranged to notify the switching network service switching point to send the call to the enhanced service capability module when the determination module determines that the capability of the existing network switching device evaluated by the evaluation module cannot support the media resources and/or the call control capability needed by the call.

Additionally, the basic call processing module may further comprise a forwarding module arranged to control the switching network service switching point to forward the call when the determination module determines that the capability of the existing network switching device evaluated by the evaluation module can support the media resources and/or the call control capability needed by the call.

The processing module may determine the media resources and the call control capability needed by the call according to a subscriber attribute and/or the type of a call number;

The determination module may determine that the capability of the existing network switching device cannot support the media resources needed by the call when the processing module determines that the media resources needed by the call are session resources, text-to-speech resources and/or automatic speech recognition resources. The determination module may determine that the capability of the existing network switching device cannot support the call control capability needed by the call when the processing module determines the call control capability needed by the call is co-vibration when being called, multi-party calling, call holding/forwarding, and/or extension queuing.

According to another aspect, a call processing method for the corporation switchboard platform above is provided. The method comprises that: determining, by a basic call processing module of a corporation switchboard service control point, whether the capability of an existing network switching device can support a call triggered by a switching network service switching point, and sending the call to an enhanced service capability module when the capability of the existing network switching device cannot support the call; and controlling an intelligent peripheral and a corporation switchboard service switching point by an enhanced service capability module to complete a service related to the call.

Furthermore, the basic call processing module may control the switching network service switching point to forward the call when the capability of the existing network switching device can support the call.

In addition, before the step that the basic call processing module determines whether the capability of the existing network switching device can support the call, the method may further comprise that: receiving the call, by the basic call processing module, and determining media resources and a call control capability needed by the call according to a subscriber attribute and/or the type of a call number, and evaluating the capability of the existing network switching device.

The step that the basic call processing module determines whether the capability of the existing network switching device can support the call may refer to that the basic call processing module determines whether the capability of the existing network switching device can support the media resources and/or the call control capability needed by the call.

By configuring a basic call processing module and an enhanced service capability module in an SCP of a corporation switchboard platform, the switchboard platform and is the call processing method disclosed in the present invention address the problem existing in related technologies that a corporation switchboard system realized in an intelligent network mode is limited by the capability of existing network devices and a corporation switchboard system realized in an intelligent platform mode is limited by the capacity of existing network devices and thus cannot provide large-scale application of services. The present invention provides more service capabilities and enriches the service characteristics of a corporation switchboard system when compared with a corporation switchboard system based on an intelligent network technology and provides a higher system capacity and reduces the rerouting cost of network when compared with a corporation switchboard system based on an intelligent platform technology.

DETAILED DESCRIPTION

As mentioned above, a corporation switchboard system realized in an intelligent network mode is a capability-limited system, while a corporation switchboard system realized in an intelligent platform mode is a capacity-limited system. It is found, is through an analysis on corporation switchboard services, that an integrated VPN service is a service that is most frequently used in a corporation switchboard system, and that more than 80% of calls involve no complicated service logic control and network capability, and only a few calls have a high requirement on network capability.

Based on the analysis above, the present invention provides an improved corporation switchboard platform, which combines the two implementation modes rationally and effectively and integrates high-capacity embodied in the intelligent network mode and high-capability embodied in the intelligent platform mode. And according to an embodiment of the present invention, the corporation switchboard platform mainly provides two service modules: a basic call processing module and an enhanced service capability module, both of which are realized in an SCP.

When a subscriber calls the corporation switchboard platform, a service is triggered by an SSP in a switching network to the SCP of the corporation switchboard platform. Then, the basic call processing module in the SCP pre-processes the call and evaluates the capability of an existing network switching device. If the call can be supported only using the existing network switching device, the basic call module controls an existing network SSP to forward the call using an intelligent network technology. When determining that the current call needs special media resources or a special call control, the basic call module determines the existing network device cannot reliably support such service and then changes the called number and informs the existing network SSP to forward the call to the enhanced service capability module of the corporation switchboard platform. After the call is forwarded to the corporation switchboard platform, the enhanced service capability module controls the SSP and the media resources provided by the corporation switchboard platform to complete a corresponding service capability.

The preferred embodiments of the present invention are illustrated below in conjunction with the accompanying drawings, and it should be appreciated that the preferred embodiments herein are intended to illustrate and explain the present invention rather than limit this invention.

Figure 1:
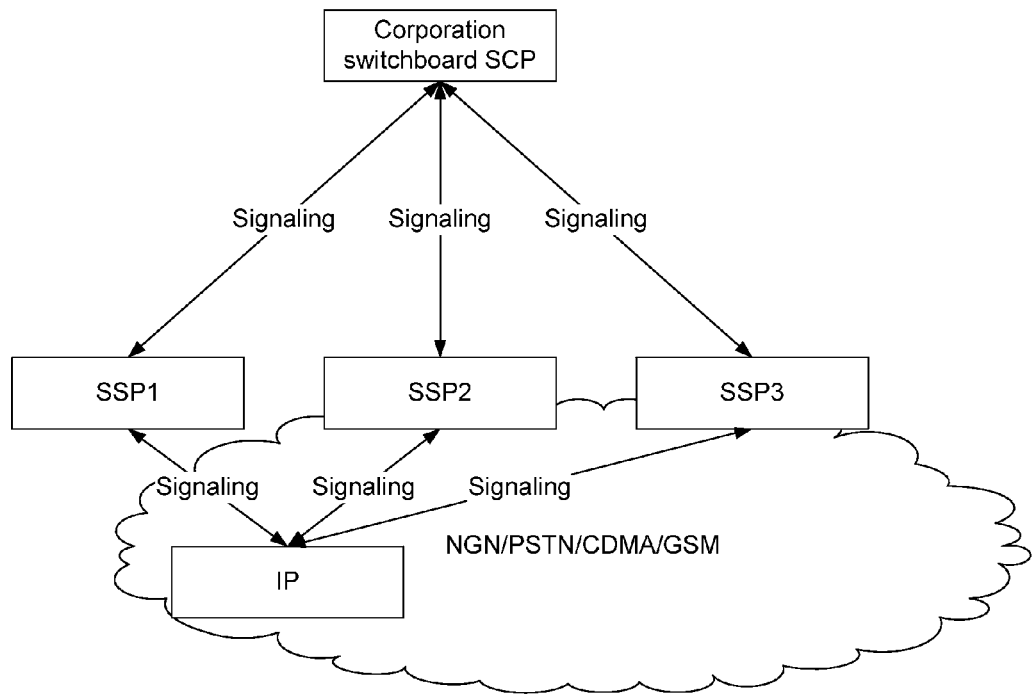
FIG. 1 is a schematic diagram illustrating the structure of a virtual switchboard system realized by an intelligent network technology in a related technology.
Figure 2:
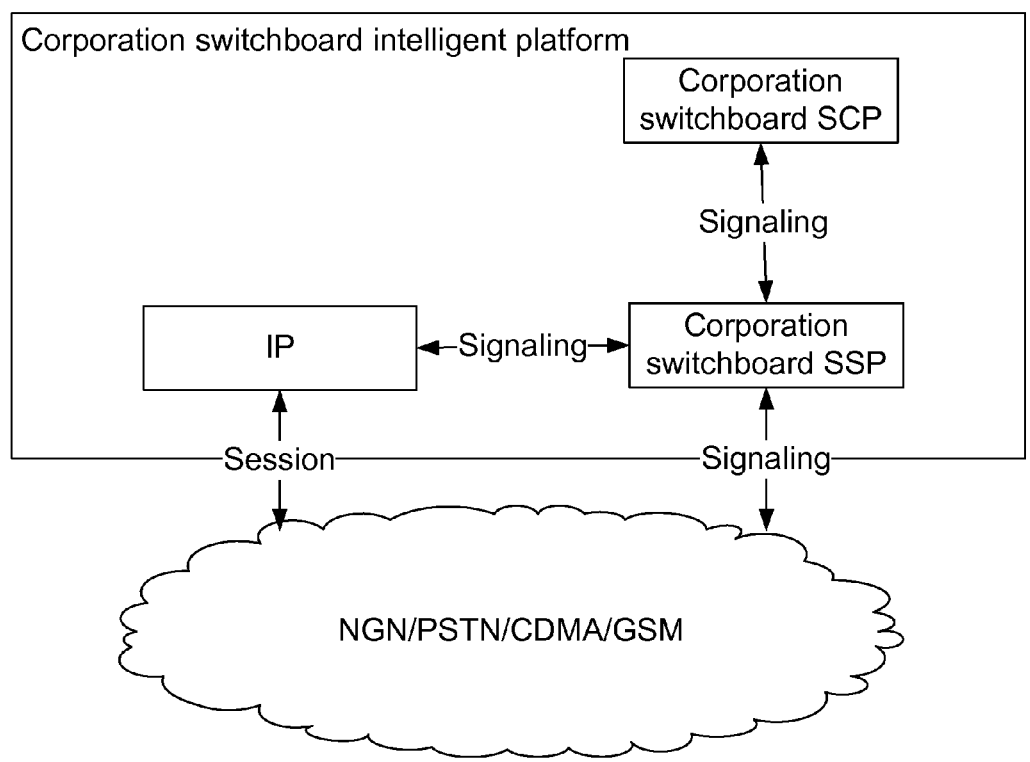
FIG. 2 is a schematic diagram illustrating the structure of a virtual switchboard system realized by an intelligent platform technology in a related technology.
Figure 3:
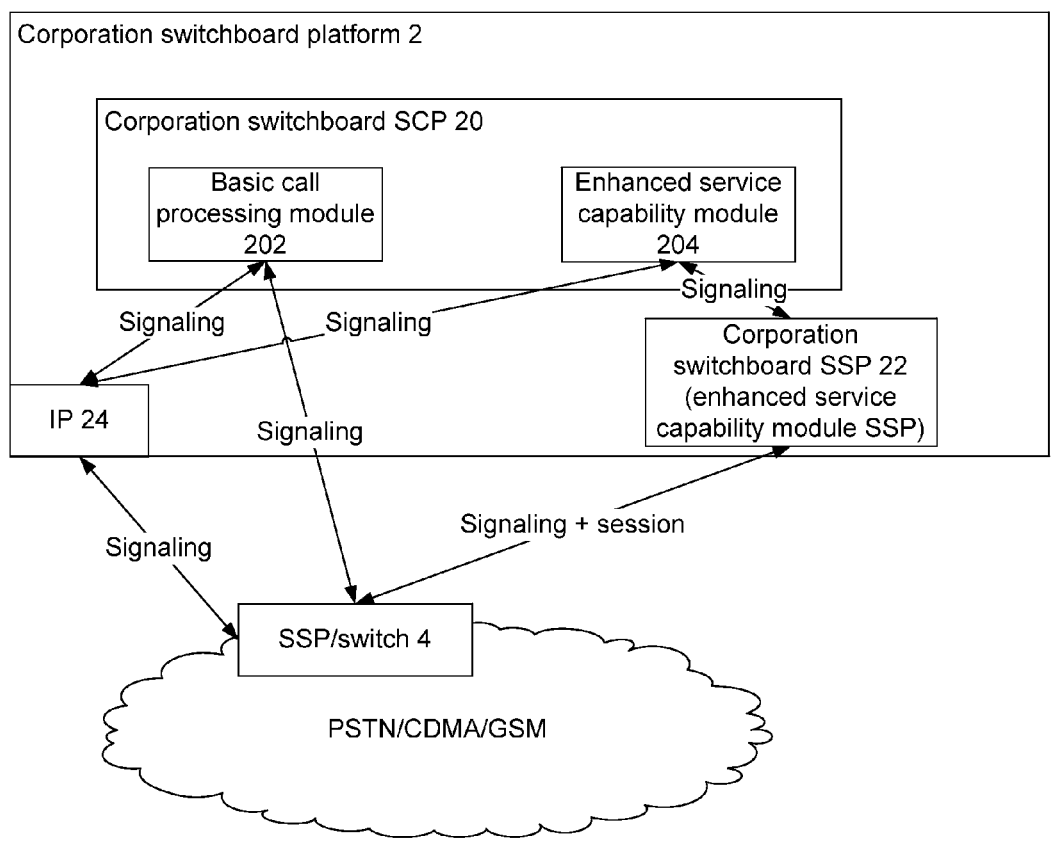
FIG. 3 is a schematic diagram illustrating the structure of a corporation switchboard platform according to an embodiment of the present invention.

An embodiment of the present invention provides a corporation switchboard platform, the structure of which is shown in FIG. 3. As shown in FIG. 3, the corporation switchboard platform comprises a corporation switchboard platform 2 and a switching network SSP/switch 4, wherein the corporation switchboard platform 2 comprises a corporation switchboard SCP 20, a corporation switchboard SSP 22 and an intelligent peripheral (IP) 24. The corporation switchboard SSP 22 herein is also referred to as an enhanced service capability module SSP, and the corporation switchboard SCP 20 comprises a basic call processing module 202 and an enhanced service capability module 204.

Each of the modules shown in FIG. 3 is detailed in conjunction with the accompanying drawings.

Figure 4:
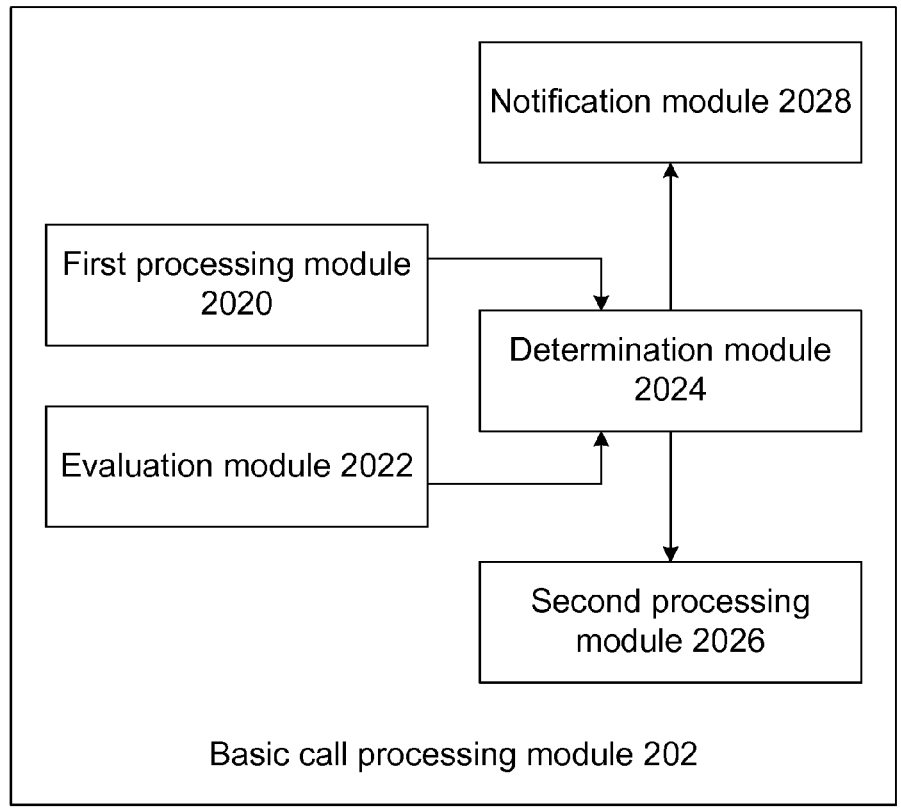
FIG. 4 is a schematic diagram illustrating the structure of a basic call processing module according to an embodiment of the present invention.

FIG. 4 is a schematic diagram illustrating the structure of a basic call processing module according to an embodiment of the present invention. As shown in FIG. 4, the basic call processing module 202 comprises a first processing module 2020, an evaluation module 2022, a determination module 2024, a second processing module 2026 and a notification module 2028.

When a subscriber calls the corporation switchboard platform 2, a service is triggered by a switching network SSP to the corporation switchboard SCP 20. The first processing module 2020 in the basic call processing module 202 of the corporation switchboard SCP 20 pre-processes the call and determines media resources and a call control capability needed by the call according to a subscriber attribute and/or the type of a call number. Then, the evaluation module 2022 in the basic call processing module 202 evaluates the capability of an existing network switching device, such as the capability of an existing network SSP. After the evaluation, the determination module 2024 in the basic call processing module 202 determines whether the capability of the existing network switching device evaluated by the evaluation module 2022 can support the media resources and the call control capability. If the determination module 2024 determines that the call can be supported only using the existing network switching device, that is, the determination module 2024 determines that the capability of the existing network switching device can support the media resources and the call control capability, the second processing module 2026 would control the switching network SSP/switch 4 to forward the call using the intelligent network technology. If the determination module 2024 determines that the call needs special media resources (such as session resources, TTS resources and ASR resources) or a special call control (such as co-vibration when being called, multi-party calling, call holding/forwarding and extension queuing) and that the existing network device cannot reliably support such services, that is, the existing network device cannot provide the special media resources or call control, the notification module 2028 would change the called number, for instance, if an original called number is A and a service access number of the enhanced service capability module 204 is B, the basic call processing module 202 would forward the call using B+A, the existing network SSP routes the call to the corporation switchboard SSP 22 via the B and sends the call to the enhanced service capability module 204 via the corporation switchboard SSP 22.

Preferably, in the 3$^{rd}$ Generation (3G) GSM network, the basic call processing module 202, which can be designed by a CAMEL originating/terminating flow module based on a broadband GSM intelligent network architecture, interacts with a switching device MSC Server of a core network using a Sigtran-born CAMEL protocol, thus solving the problems including authentication on calling and called parties when a mobile subscriber initiates a call or terminates a call, processing on a calling number and a called number, a roaming state control, basic call charging, a route control and the like. By cooperating with devices of the core network, a CAMEL module controls the core network to realize simple call-related voice prompt and call control such as call holding and call forwarding for the mobile subscriber.

The introduction of the CAMEL module realizes a common short number call inside a corporation and a common call for a corporation subscriber number. As such calls make up the majority of the total telephone traffic and are the decisive factor of system capacity, the introduction of the CAMEL module can make such calls controlled and processed at a high efficiency and consequentially improve the processing capability and the capacity of the system.

Figure 5:
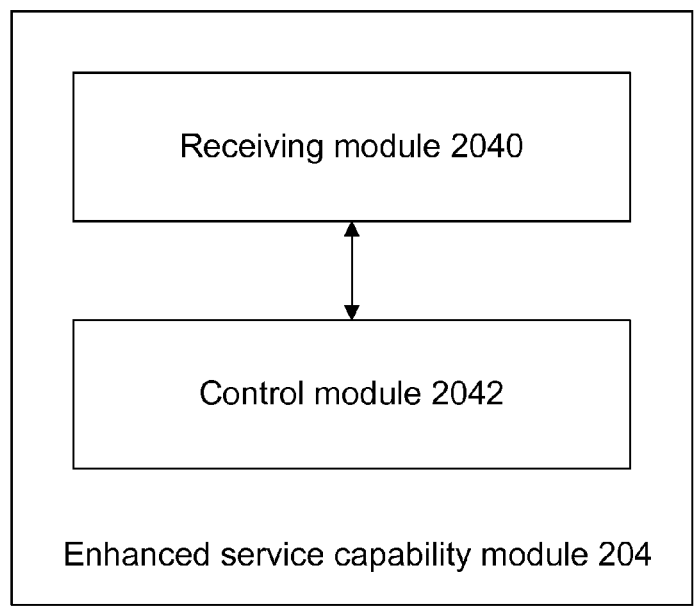
FIG. 5 is a schematic diagram illustrating the structure of an enhanced service capability module according to an embodiment of the present invention.

FIG. 5 is a schematic diagram illustrating the structure of an enhanced service capability module according to an embodiment of the present invention. As shown in FIG. 5, the enhanced service capability module 204 comprises a receiving module 2040 and a control module 2042.

Specifically, when the determination module 2024 in the basic call processing module 202 determines that an existing network device cannot reliably support special media resources or a special call control needed by a call, the receiving module 2040 in the enhanced service capability module 204 receives the call forwarded by the corporation switchboard SSP 22, then the control module 2042 in the enhanced service capability module 204 controls corresponding media resources and the corporation switchboard SSP 22 to complete a service related to the call.

Preferably, in a 3G GSM network, the enhanced service capability module 204 based on a Session Initiation Protocol (SIP) provides advanced call processing, however, a more flexible and functional SIP enhanced service capability module 204 is is needed when a call involves a personal customized speech of welcome/multimedia ring back tone, a corporation-customized Interactive Voice Response (IVR) flow, ASR dialing, agent-participated incoming call queuing, call forwarding and controlling, an Email or short message-related call, a Voice Message System (VMS), a call center and the like.

Different from common calls, such calls account for a small proportion but have a high requirement on needed service capability, needing processing on a great quantity of customized voices, the participation of an agent in a call, agent queuing and call queuing, voice and data information processing and the like, therefore, the advanced processing capability of the SIP enhanced service capability module 204 is introduced to control and process such calls. Besides, the SIP enhanced service capability module 204 further provides plenty of third-party interfaces for facilitating the expansion and upgrade of the service capability.

By effectively combining the intelligent network technology with the intelligent platform technology, the present invention provides a corporation switchboard system with high-capacity and high-performance, which provides more service capabilities and richer service characteristics than a corporation switchboard system only based on the intelligent network technology and provides a higher system capacity and less network rerouting overhead than a corporation switchboard system only based on the intelligent platform technology.

Furthermore, by effectively combining the intelligent network technology with the intelligent platform technology, an integrated VPN service is additionally provided with novel service characteristics, such as an extension queuing function, so that a subscriber can bind multiple terminals to one VPN short number and distribute calls for the short number to different terminals according to a given algorithm; and a short number dialing function is provided for services of a corporation call center, thus expanding the service capability of the corporation call center.

Moreover, two corporation switchboard systems respectively based on the intelligent platform technology and the intelligent network technology can be conveniently upgraded to the one provided herein, without making a significant change on software and hardware structures.

It should be noted that the aforementioned modules can be variously modified and combined without departing from the spirit and scope clarified by the appended claims.

Figure 6:
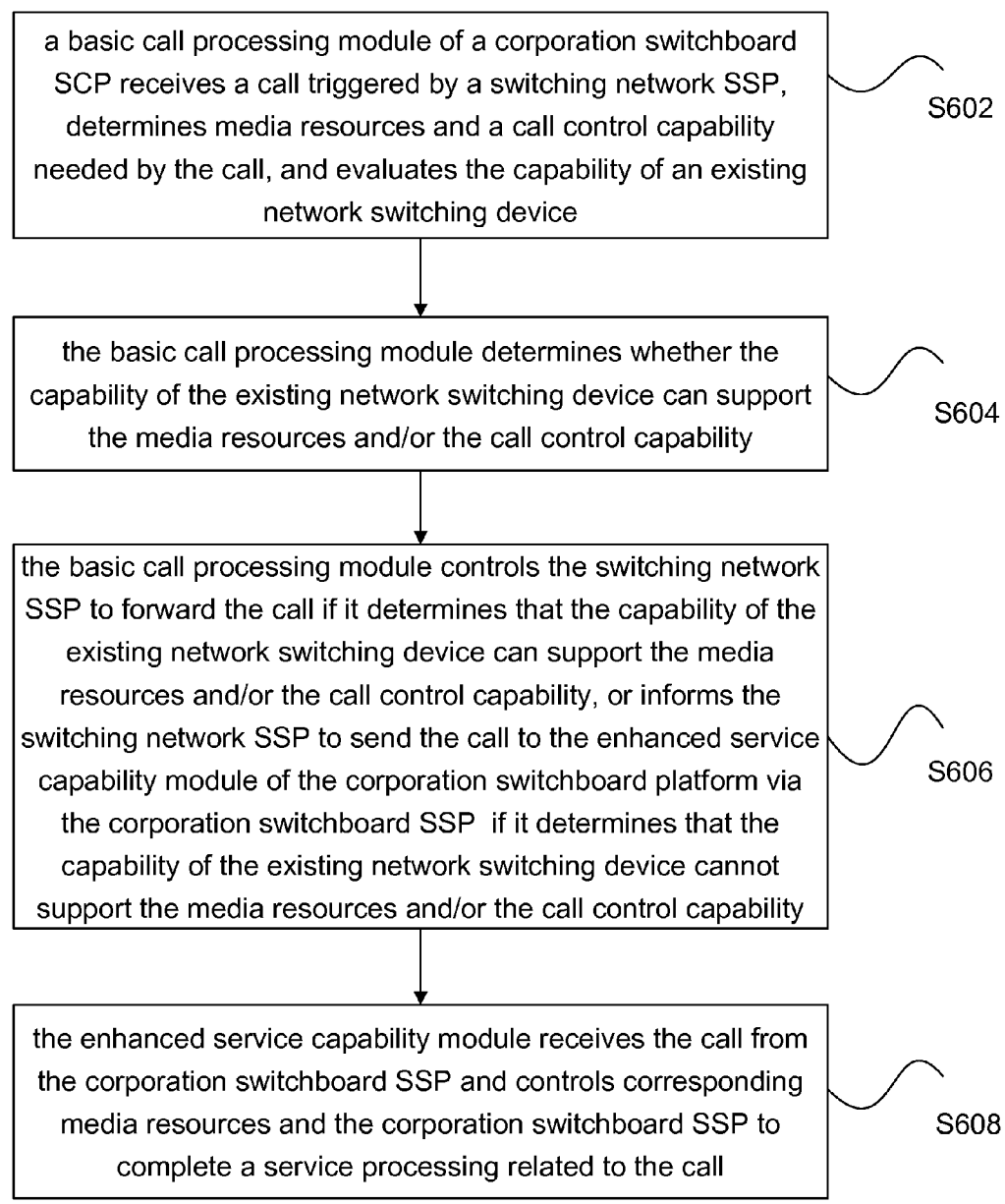
FIG. 6 is a schematic diagram illustrating a realization flow of a call processing method according to an embodiment of the present invention.

FIG. 6 is a schematic diagram illustrating a realization flow of a call processing method according to an embodiment of the present invention. As shown in FIG. 6, the call processing method provided by this embodiment comprises the following steps.

Step S602: A basic call processing module of a corporation switchboard SCP receives a call triggered by a switching network SSP, determines media resources and a call control capability needed by the call according to a subscriber attribute and/or the type of a call number, and evaluates the capability of an existing network switching device.

Step S604: The basic call processing module determines whether the capability of the existing network switching device can support the media resources and/or the call control capability.

Step S606: The basic call processing module controls the switching network SSP to forward the call when determining the capability of the existing network switching device can support the media resources and/or the call control capability;

it is determined, if the basic call processing module determines that the call needs special media resources and/or a special call control, that the capability of the existing network switching device cannot meet the need for the media resources and the call control capability, i.e. if the determining result is negative, the basic call processing module would inform the switching network SSP to send the call to an enhanced service capability module of a corporation switchboard platform via a corporation switchboard SSP.

The special media resources include at least one of the following resources: conference resources, TTS resources and ASR resources. The special call control includes at least one of the following controls: co-vibration when being called, multi-party calling, call holding/forwarding and extension queuing.

Step S608: The enhanced service capability module receives the call from the corporation switchboard SSP and controls corresponding media resources and the corporation switchboard SSP to complete service processing related to the call.

The technical solution above is illustrated below in combination with specific examples.

EXAMPLE 1

A corporation switchboard system initiates a call and terminates the call for a mobile core network using a basic call processing module.

Figure 7:
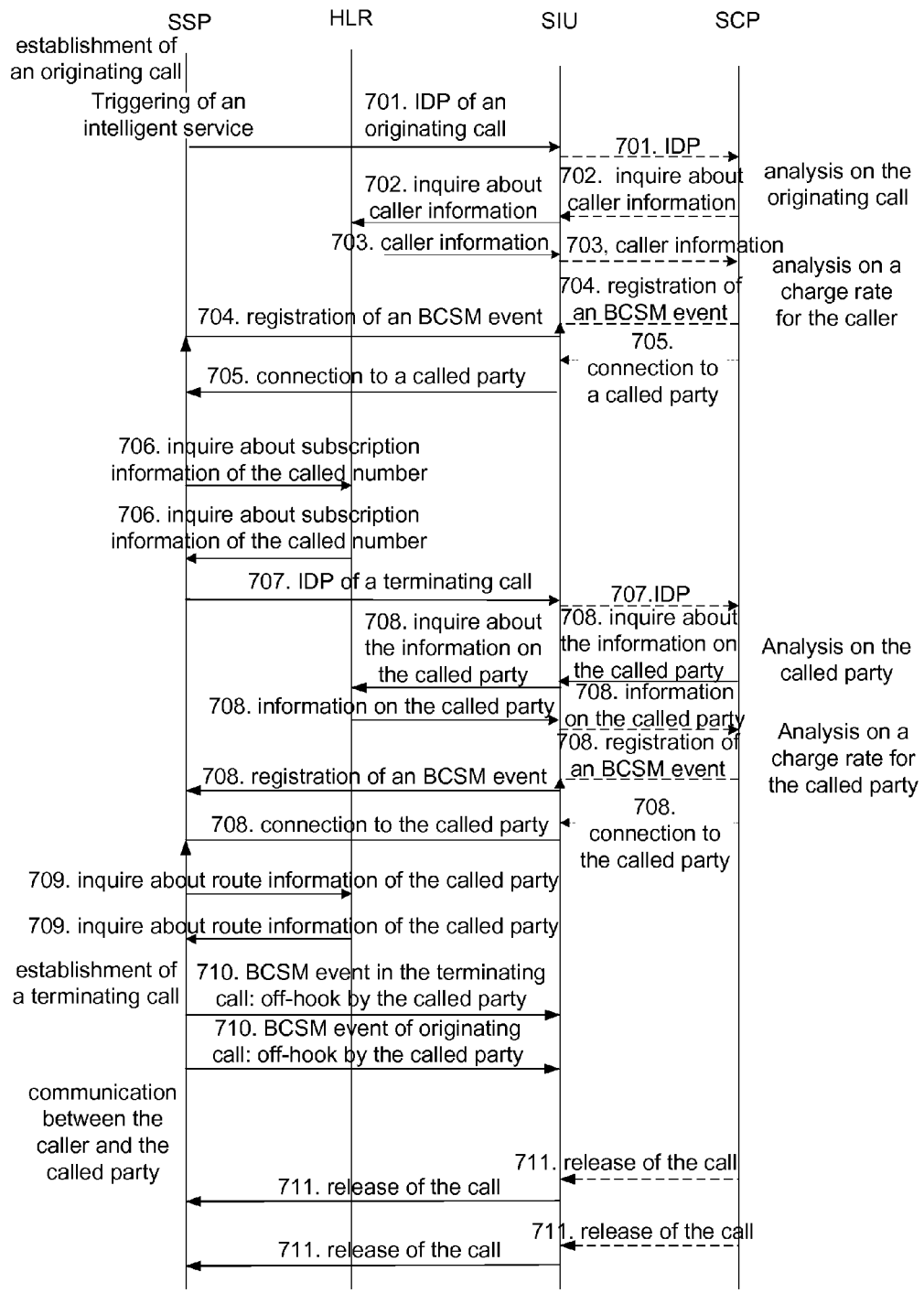
FIG. 7 is a signaling flow chart of example 1 according to an embodiment of the present invention.

FIG. 7 is a signaling flow chart of example 1 according to an embodiment of the present invention, which involves the following entities: an SSP, an HLR, a Signaling Interface Unit (SIU) and an SCP. As shown in FIG. 7, the process that a corporation switchboard system initiates a call and terminates the call for a mobile core network is using a basic call processing module comprises the following steps.

Step 701: A switching network service switching point (SSP) triggers a basic call processing intelligent service of a caller to a corporation switchboard service control point (SCP) in an originating subscription manner; this step is corresponding to S602 shown in FIG. 6.

Step 702: The SCP analyzes and authenticates the calling number, and in order to acquire location information of the calling number to determine whether the caller is in a roaming state, the SCP inquires of a home location register (HLR) about location information of the caller.

Step 703: The HLR returns the location information of the caller to the SCP.

Step 704: The SCP determines a charge rate for the caller according to information of the caller and the called party as well as the location information of the caller, and registers a Basic Call State Model (BCSM) event with the SSP so as to acquire BSCM event information.

Step 705: The SCP changes a called number from a short extension number to a long real number and sends a call proceeding command to the SSP.

Step 706: The SSP inquires of the HLR about subscription information of the called number.

Step 707: The SSP triggers a basic call processing intelligent service of a called party to the SCP according to the subscription information of the called number.

Step 708: The called number is processed in the basic call processing module in a manner similar to that the calling number is processed, besides, a route prefix is added into the called number connected during the called process to instruct the SSP to inhibit the subscription information inquiry operation.

Specifically, as to the processing performed by the basic call processing module on the called number, step 708 further comprises the following four steps:

step 708a: the SCP analyzes and authenticates the called number, and inquires of the HLR about the location information of the called party to determine whether the called party is in a roaming state according to the acquired location information;

step 708b: the HLR returns the location information of the called party to the SCP;

step 708c: the SCP determines a charge rate for the called party according to the information of the caller and the called party as well as the location information of the called party and registers a BCSM event with the SSP so as to acquire BSCM event information;

step 708d: the SCP changes the calling number from a long extension number to a short number and sends a call proceeding command to the SSP.

Step 709: The SSP acquires the called number with the route prefix, removes the route prefix, inquires of the HLP about a dynamic roaming called number, and calls the called party;

Step 710: a communication is realized between the caller and the called party and terminated if either of the two parties hangs up, and the SSP reports the on-hook BCSM event; and Step 711: the SCP releases the current session and provides a detailed calling record and a detailed answering record, and the call is terminated.

EXAMPLE 2

A corporation switchboard system initiates a call and terminates the call for a mobile core network using a basic call processing module and an enhanced service capability module.

Figure 8:
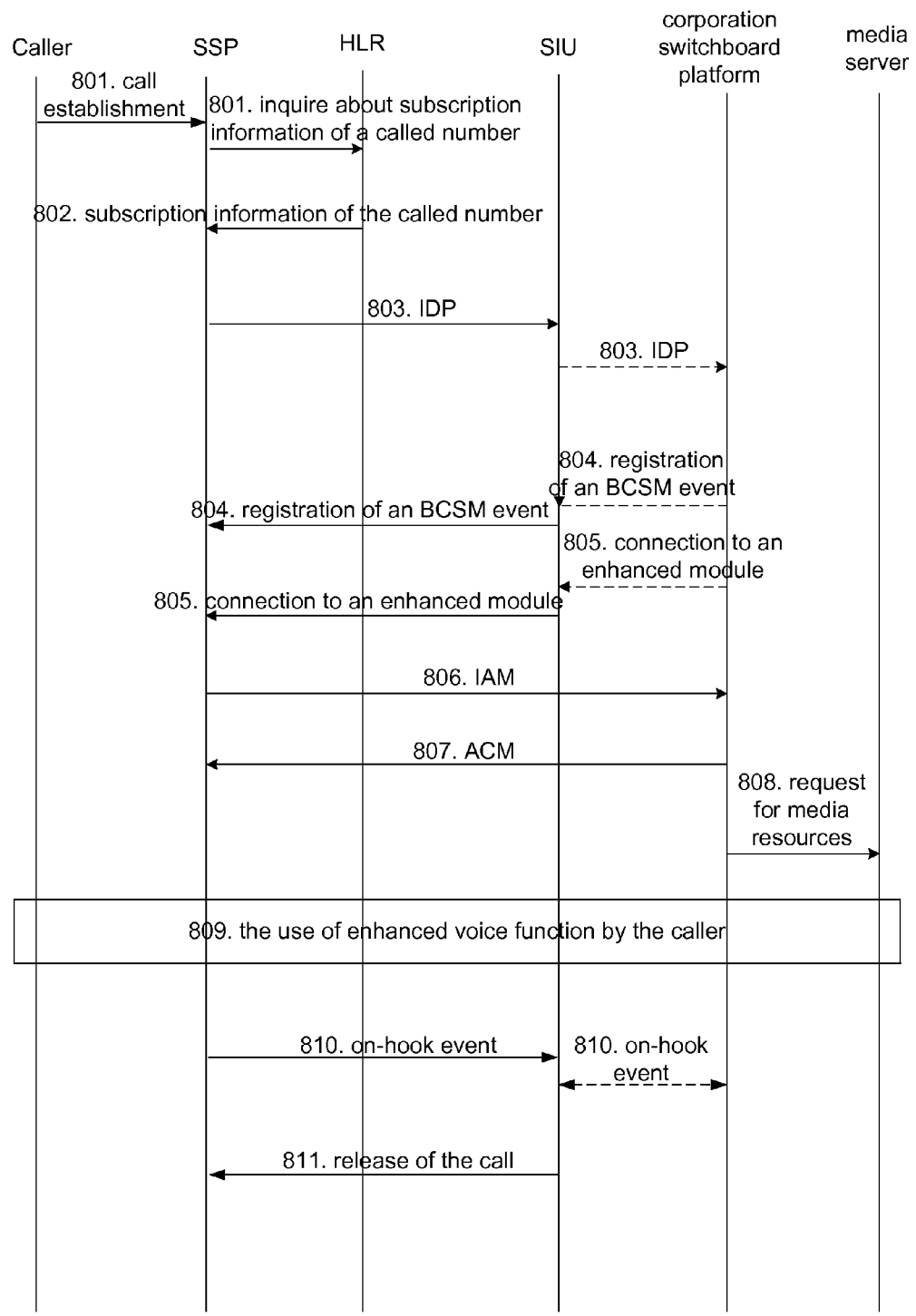
FIG. 8 is a signaling flow chart of example 2 according to an embodiment of the present invention.

FIG. 8 is a signaling flow chart of example 2 according to an embodiment of the present invention, which involves the following entities: a caller, an SSP, an HLR, an SIU, a corporation switchboard platform and a media server. As shown in FIG. 8, the process that a corporation switchboard system initiates a call and terminates the call for a mobile core network using a basic call processing module and an enhanced service capability module comprises the following steps.

Step 801: The caller calls a corporation switchboard number, the SSP to which the caller belongs inquires of the HLR about subscription information of the corporation switchboard number;

Step 802: the HLR returns the subscription information of the corporation switchboard number to the SSP;

Step 803: the SSP triggers the basic call processing module of an SCP via an Initial Detection Point (IDP) message, this step is corresponding to step S602 shown in FIG. 6;

Step 804: the SCP recognizes, in the basic call processing module, that the called number is the switchboard number which needs a voice resource support from the media server, and then registers a BCSM event with the SSP, this step is corresponding to step S606 shown in FIG. 6;

Step 805: the SCP forwards the call to the enhanced service module, and the enhanced service module performs further processing on the call, this step is corresponding to step S608 shown in FIG. 6;

Step 806: responding to a call forwarding request of the SCP, the SSP forwards the call to the enhanced service module of the corporation switchboard platform via inter-office signaling such as ISUP signaling;

Step 807: the corporation switchboard platform responds to inter-office Integrated Service Digital Network User Protocol (ISDN User Protocol, ISUP) signaling from the SSP;

Step 808: the enhanced service module of the corporation switchboard platform controls a corresponding resource module to complete various flexible service processing;

in this example, a subscriber dials an agent short number of a corporation operator group, if the operators of the operator group are all busy, the corporation switchboard platform plays a queue waiting tone for the subscriber using the media server, and then, the enhanced service module SSP of the corporation switchboard platform selects the first idle operator under the control of the enhanced service module SCP and connects the call to the telephone terminal of the operator;

Step 809: the subscriber communicates with the operator at the corporation switchboard platform, and during the communication, the operator can forward the call to another extension number according to instructions of the subscriber;

Step 810: the subscriber hangs up after the enhanced service module finishes the processing, and the SSP informs the corporation switchboard platform of this on-hook event via the inter-office ISUP signaling; and Step 811: the corporation switchboard platform releases the call forwarded to the enhanced service module and the basic call processing module.

As mentioned above, by configuring a basic call processing module and an enhanced service capability module in an SCP of a corporation switchboard platform, the technical solution of the present invention addresses the problem that a corporation switchboard system realized in an intelligent network mode is limited by the capability of existing network devices and that a corporation switchboard system realized in an intelligent platform mode cannot provide large-scale application of services.

Apparently, it should be understood by those skilled in the art that the modules or steps of the present invention can be realized by universal computing devices, which can be centralized on a single computing device or distributed in a network consisting of multiple computing devices, and optionally realized by computing device-executable program codes; the modules or steps can be therefore stored in a storage device to is be executed by a computing device or separately manufactured into integrated circuit modules, or some of the modules or steps can be manufactured into a single integrated circuit module. Thus, the present invention is not limited to any special combination of hardware and software.

The above mentioned are only preferred embodiments of the present invention, which are not intended to limit this invention. Various modifications and variations can be devised by those skilled in the art, and it should be understood that any modification, equivalent substitute and improvement devised without departing from the spirit and scope of the present invention should be embraced in the protection scope of the invention.

What is claimed is:

1. A corporation switchboard platform, comprising: a corporation switchboard service control point, a corporation switchboard service switching point and an intelligent peripheral, wherein the corporation switchboard service control point comprises a basic call processing module and an enhanced service capability module;
   the basic call processing module is arranged to determine whether capability of an existing network switching device can support a call triggered by a switching network service switching point, and send the call to an enhanced service capability module when the capability of the existing network switching device cannot support the call; and
   the enhanced service capability module is arranged to control the intelligent peripheral and the corporation switchboard service switching point to complete a service processing related to the call.

2. The corporation switchboard platform according to claim 1, wherein the basic call processing module is further arranged to control the switching network service switching point to forward the call when the capability of the existing network switching device can support the call.

3. The corporation switchboard platform according to claim 1, wherein the basic call processing module further comprises a processing module, an evaluation module, a determination module and a notification module;
   the processing module is arranged to pre-process the call and determine media resources and a call control capability needed by the call;
   the evaluation module is arranged to evaluate the capability of the existing network switching device;
   the determination module is arranged to determine whether the capability of the existing network switching device evaluated by the evaluation module can support the media resources and/or the call control capability needed by the call; and
   the notification module is arranged to notify the switching network service switching point to send the call to the enhanced service capability module when the determination module determines that the capability of the existing network switching device evaluated by the evaluation module cannot support the media resources and/or the call control capability needed by the call.

4. The corporation switchboard platform according to claim 3, wherein the basic call processing module further comprises a forwarding module arranged to control the switching network service switching point to forward the call when the determination module determines that the capability of the existing network switching device evaluated by the evaluation module can support the media resources and/or the call control capability needed by the call.

5. The corporation switchboard platform according to claim 3, wherein the processing module determines the media resources and the call control capability needed by the call according to a subscriber attribute and/or a type of a call number.

6. The corporation switchboard platform according to claim 3, wherein
   the determination module determines that the capability of the existing network switching device cannot support the media resources needed by the call when the processing module determines that the media resources needed by the call are conference resources, text-to-speech resources and/or automatic speech recognition resources; and
   the determination module determines that the capability of the existing network switching device cannot support the call control capability needed by the call when the processing module determines the call control capability needed by the call is co-vibration when being called, multi-party calling, call holding/forwarding, and/or extension queuing.

7. A call processing method for the corporation switchboard platform of claim 1, comprising:
   determining, by a basic call processing module of a corporation switchboard service control point, whether the capability of an existing network switching device can support a call triggered by a switching network service switching point, and sending the call to an enhanced service capability module when the capability of the existing network switching device cannot support the call; and
   controlling an intelligent peripheral and a corporation switchboard service switching point by the enhanced service capability module to complete a service processing related to the call.

8. The method according to claim 7, wherein the basic call processing module controls the switching network service switching point to forward the call when determining the capability of the existing network switching device can support the call.

9. The method according to claim 7, further comprising:
   before the step that the basic call processing module determines whether the capability of the existing network switching device can support the call, the basic call processing module receiving the call, determining media resources and a call control capability needed by the call according to a subscriber attribute and/or the type of a call number, and evaluating the capability of the existing network switching device.

10. The method according to claim 9, wherein the step that the basic call processing module determines whether the capability of the existing network switching device can support the call refers to that:
    the basic call processing module determines whether the capability of the existing network switching device can support the media resources and/or the call control capability needed by the call.

11. The method according to claim 10, wherein the media resources needed by the call are session resources, text-to-speech resources, and/or speech recognition resources; and
- the call control capability needed by the call is co-vibration when being called, multi-party calling, call holding/forwarding, and/or extension queuing.

12. The corporation switchboard platform according to claim 4, wherein
- the determination module determines that the capability of the existing network switching device cannot support the media resources needed by the call when the processing module determines that the media resources needed by the call are conference resources, text-to-speech resources and/or automatic speech recognition resources; and
- the determination module determines that the capability of the existing network switching device cannot support the call control capability needed by the call when the processing module determines the call control capability needed by the call is co-vibration when being called, multi-party calling, call holding/forwarding, and/or extension queuing.

13. The corporation switchboard platform according to claim 5, wherein
- the determination module determines that the capability of the existing network switching device cannot support the media resources needed by the call when the processing module determines that the media resources needed by the call are conference resources, text-to-speech resources and/or automatic speech recognition resources; and
- the determination module determines that the capability of the existing network switching device cannot support the call control capability needed by the call when the processing module determines the call control capability needed by the call is co-vibration when being called, multi-party calling, call holding/forwarding, and/or extension queuing.

14. The method according to claim 8, further comprising: before the step that the basic call processing module determines whether the capability of the existing network switching device can support the call, the basic call processing module receiving the call, determining media resources and a call control capability needed by the call according to a subscriber attribute and/or the type of a call number, and evaluating the capability of the existing network switching device.

15. The method according to claim 14, wherein the step that the basic call processing module determines whether the capability of the existing network switching device can support the call refers to that:
- the basic call processing module determines whether the capability of the existing network switching device can support the media resources and/or the call control capability needed by the call.

16. The method according to claim 15, wherein the media resources needed by the call are session resources, text-to-speech resources, and/or speech recognition resources; and
- the call control capability needed by the call is co-vibration when being called, multi-party calling, call holding/forwarding, and/or extension queuing.

* * * * *